United States Patent
Mori et al.

[11] Patent Number: 5,929,153
[45] Date of Patent: Jul. 27, 1999

[54] VINYL CHLORIDE-BASED POLYMER-POLYURETHANE COMPOSITE AND METHOD OF PRODUCING THE SAME

[75] Inventors: Katsuaki Mori, Yokkaichi; Kazuyuki Okamoto, Suzuka; Yasunobu Adachi, Yokkaichi, all of Japan

[73] Assignee: Tosoh Corporation, Japan

[21] Appl. No.: 08/567,909

[22] Filed: Dec. 6, 1995

[30] Foreign Application Priority Data

| Dec. 15, 1994 | [JP] | Japan | 6-312035 |
| Jan. 6, 1995 | [JP] | Japan | 7-000682 |
| Jan. 6, 1995 | [JP] | Japan | 7-000684 |
| Jul. 26, 1995 | [JP] | Japan | 7-190207 |

[51] Int. Cl.$^6$ .............. C08K 5/09; C08K 5/01; C08L 75/04
[52] U.S. Cl. .......... 524/399; 524/400; 524/490; 524/777; 524/778; 524/779; 524/783; 524/848; 524/871; 525/123; 525/129; 525/131; 525/235; 525/331.5; 525/455
[58] Field of Search ............ 525/123, 129, 525/131, 235, 331.5, 455; 524/399, 400, 490, 777, 778, 779, 783, 848, 871

[56] References Cited

U.S. PATENT DOCUMENTS

| 2,606,162 | 8/1952 | Coffey et al. | 525/129 |
| 4,035,440 | 7/1977 | Khanna et al. | 525/131 |
| 4,956,222 | 9/1990 | Matsuura et al. | 521/57 |
| 5,055,522 | 10/1991 | Ikeda et al. | 525/124 |
| 5,096,756 | 3/1992 | Walters | 525/131 |
| 5,225,487 | 7/1993 | Kobayashi et al. | 525/123 |
| 5,242,965 | 9/1993 | Ito et al. | 524/377 |
| 5,360,871 | 11/1994 | Iwanaga et al. | 525/131 |

FOREIGN PATENT DOCUMENTS

| 61-250044 | 4/1985 | Japan . |
| 4-220416 | 12/1990 | Japan . |
| 6184384 | 12/1992 | Japan . |
| 6306233 | 4/1993 | Japan . |
| 6-184384 | 7/1994 | Japan . |
| 915889 | 1/1963 | United Kingdom . |
| 1119949 | 7/1968 | United Kingdom . |
| 1270836 | 4/1972 | United Kingdom . |

*Primary Examiner*—Rabon Sergent
*Attorney, Agent, or Firm*—Nixon & Vanderhye

[57] ABSTRACT

Disclosed are a vinyl chloride-based polymer-polyurethane composite comprising vinyl chloride-based polymer (1), polyurethane, plasticizer (4), metal salt of higher fatty acid (6) and hydrocarbon-based lubricant (7), the metal of metal salt of higher fatty acid being at least one element selected from a group consisting of magnesium, zinc and lead, which have low hardness and excellent hydrolysis resistance, compression set characteristic and profile extrusion moldability, and a method of producing vinyl chloride-based polymer-polyurethane composite which is produced by means of of heating, melting and mixing not less than 200 parts by weight to not more than 800 parts by weight of polymer polyol (2), isocyanate compound (3) with three or more isocyanate groups in amount of the molar ratio of isocyanate group in isocyanate compound (3) to hydroxyl group in polymer polyol (2) being not less than 0.3 to not more than 0.8, not less than 10 parts by weight to not more than 300 parts by weight of plasticizer (4) and urethanating reaction catalyst (5) to 100 parts by weight of vinyl chloride-based polymer (1) under shear force.

8 Claims, No Drawings

VINYL CHLORIDE-BASED POLYMER-POLYURETHANE COMPOSITE AND METHOD OF PRODUCING THE SAME

BACKGROUND OF THE INVENTION

The present invention relates to a vinyl chloride-based polymer (hereinafter referred to as PVC)-polyurethane (hereinafter referred to as PU) composite comprising PU, PVC and plasticizer and having low hardness and excellent hydrolysis resistance, compression set characteristic and profile extrusion moldability, and a method of producing the same.

Japanese Unexamined Patent Publication No. Hei 3-294326 (U.S. Pat. No. 5,360,871) proposed a vinyl chloride-based resin composition wherein vinyl chloride resin, polymer polyol with a specified molecular weight range and compound with three or more isocyanate groups were heated, molten and mixed under shear force and the tetrahydrofuran insolubles of said composition were 5 to 55% by weight.

Japanese Unexamined Patent Publication No. Hei 4-220416 proposed a vinyl chloride-based resin composition with excellent gelling meltability and surface smoothness wherein vinyl chloride-based resin composition obtainable by adding 5 to 100 parts by weight of plasticizer to 100 parts by weight of vinyl chloride resin followed by drying-up, polymer polyol and isocyanate compound with three or more isocyanate groups were heated, molten and mixed under shear force and the tetrahydrofuran insolubles of said composition were 5 to 60% by weight.

Japanese Unexamined Patent Publication No. Hei 6-184384 proposed a method of producing transparent vinyl chloride-polyurethane elastomer wherein PVC, polymer polyol with a specified molecular weight and molecular structure, isocyanate compound with three or more isocyanate groups and plasticizer were heated, molten and mixed under shear force.

Japanese unexamined Patent Publication No. Hei 6-306233 proposed a thermoplastic elastomer resin composition wherein it comprised poly(vinyl chloride)-based resin, polyurethane and plasticizer and it used polyurethane with crosslinking structure as a polyurethane and with a value of loss tangent (tan δ) obtainable from the temperature dependence of dynamic viscoelasticity in linear region and tensile mode being 0.3 or higher at a temperature 30° C. higher than the glass transition temperature estimated from the maximum value of tan δ.

The vinyl chloride-based resin compositions obtainable from Japanese Unexamined Patent Publication No. Hei 3-294326 and Japanese Unexamined Patent Publication No. Hei 4-220416 had high hardness, which was not satisfactory for the requirement of hardness reduction.

The transparent poly(vinyl chloride)-polyurethane elastomer obtainable from Japanese Unexamined Patent Publication No. Hei 6-184384 gave the surface smoothness not always satisfactory on extrusion molding.

The thermoplastic elastomer resin composition obtainable from Japanese Unexamined Patent Publication No. Hei 6-306233 also fell one jump short for the requirement of hardness reduction.

And, these materials obtainable by the methods aforementioned were poor in the profile extrusion moldability, particularly in the case of hardness reduction, because they incurred adhesion to metal on extrusion molding. The purpose of the invention is to provide a PVC-PU composite comprising PVC, PU and plasticizer and having low hardness and excellent hydrolysis resistance, compressive permanent strain characteristic and profile extrusion moldability, and a method of producing the same with high productivity.

In view of the present situation as described above, the inventors contemplated the hardness reduction through the formulation level of polymer polyol (2), molar ratio of NCO/OH, formulation level of plasticizer (4), kneading method and the like, and have found that a PVC-PU composite with improved surface smoothness on extrusion molding and profile extrusion moldability can be obtained through the improvement in kneading method and the finding of suitable processing aid, leading to the completion of the invention.

SUMMARY OF THE INVENTION

The gist of the invention is to provide a method of producing PVC-PU composite which is produced by means of heating, melting and mixing not less than 200 parts by weight to not more than 800 parts by weight of polymer polyol (2), isocyanate compound (3) with three or more isocyanate groups in amount of the molar ratio of isocyanate group in isocyanate compound (3) to hydroxyl group in polymer polyol (2), being not less than 0.3 to not more than 0.8, not less than 10 parts by weight to not more than 300 parts by weight of plasticizer (4) and urethanating reaction catalyst (5) to 100 parts by weight of PVC (1) under shear force, and a PVC-PU composite comprising PVC (1), PU, plasticizer (4), metal salt (6) of higher fatty acid and hydrocarbon-based lubricant (7), wherein the metal of that metal salt is at least one element selected from a group consisting of magnesium, zinc and lead.

DETAILED DESCRIPTION OF THE INVENTION

In following, the invention will be illustrated in detail.

The PVC (1) to be used in the invention is vinyl chloride-containing polymer, and vinyl chloride homopolymer, chlorinated vinyl chloride polymer, vinyl chloride copolymer obtainable through random copolymerization, graft copolymerization or block copolymerization with at least one kind of monomer copolymerizable with vinyl chloride monomer, or mixtures of two or more of these polymers can be mentioned.

As the monomers copolymerizable with vinyl chloride monomer, for example, ethylene, propylene, butene, pentene-1, butadiene, styrene, a-methylstyrene, acrylonitrile, vinylidene chloride, vinylidene cyanide, alkyl vinyl ethers such as methyl vinyl ether, vinyl carboxylate esters such as vinyl acetate, aryl ethers such as methoxystyrene, dialkylmaleic acids such as dimethylmaleic acid, fumaric esters such as dimethyl fumarate, N-vinylpyrrolidone, vinylpyridine, vinylsilanes, alkyl acrylate esters such as butyl acrylate, alkyl methacrylate esters such as methyl methacrylate, and the like can be mentioned.

The polymerization degree of PVC (1) is not particularly restricted and any level can be used. From the point of molding processibility, however, those with not less than 1200 to not more than 4000 can be used suitably.

Moreover, when impregnating polymer polyol (2) and plasticizer (4) into PVC (1) upon producing the inventive PVC-PU composite as described later, PVC (1) is preferable to be one obtained through suspension polymerization process.

Furthermore, if using ethylene-vinyl chloride copolymer as PVC, then PVC-PU composite with excellent softness can be obtained, making it preferable to use this.

The PU to be used in the invention is PU with network structure formed through the reaction between polymer polyol and compound with three or more isocyanate groups.

The polymer polyol (2) means those with two or more hydroxyl groups. For example, polyester-based polyol, polyether-based polyol, polycarbonate-based polyol, vinyl type polyol, diene type polyol, castor oil-based polyol, silicone-based polyol, polyolefin-based polyol, copolymers of these, or the like are mentioned, and one or not less than two kinds of these are used.

The molecular weight of polymer polyol (2) is not particularly restricted and any level can be used. However, from the points of easy handling of polymer polyol (2) and development of good compressive permanent strain at low hardness, the number average molecular weight is preferable to be not less than 500 to not more than 8000.

The polyester-based polyol can be obtained, for example, through the condensation polymerization of dicarboxylic acid with short chain polyol. At this time, as the dicarboxylic acid components, succinic acid, glutaric acid, adipic acid, azelaic acid, sebacic acid, dodecanoic acid, phthalic acid, isophthalic acid, tetrahydrophthalic anhydride, hexahydrophthalic anhydride, maleic anhydride, fumaric acid, itaconic acid, and the like are mentioned, and one or not less than two kinds of these are used. On the other hand, the short chain polyol components include aliphatic, alicyclic, aromatic, substituted aliphatic or heterocyclic dihydroxyl compounds, trihydroxyl compounds, tetrahydroxyl compounds and the like. For example, 1,2-ethanediol, 1,2-propanediol, 1,4-butanediol, butenediol, 3-methyl-1,5-pentanediol, 1,6-hexanediol, 1,10-decamethylenediol, 2,5-dimethyl-2,5-hexanediol, neopentyl glycol, diethylene glycol, 1,4-cyclohexane dimethanol, 2-methyl-1,8-octanediol, 1,9-nonanediol, bis(β-hydroxyethoxy)benzene, p-xylenediol, dihydroxyethyltetrahydrophthalate, trimethylolpropane, glycerine, 2-methylpropane-1,2,3-triol, 1,2,6-hexanetriol, and the like are mentioned, and one or not less than two kinds of these are used.

As another method to obtain polyester-based polyol, it is also possible to mention a method of reacting one or not less than two kinds of lactone compounds such as β-propiolactone, pivalolactone, δ-valerolactone, β-methyl-δ-valerolactone, ε-caprolactone, methyl-ε-caprolactone, dimethyl-ε-caprolactone and trimethyl-ε-caprolactone with one or not less than two kinds of hydroxyl compounds selected from said short chain polyol components.

As the polyether-based polyols, polytetramethylene glycol, polyethylene glycol, polypropylene glycol, polyoxypropylene glycol, and the like are mentioned, and one or not less than two kinds of these are used.

For the polycarbonate-based polyols, those obtained through the ester exchange process between one or not less than two kinds of hydroxyl compounds selected from said short chain polyols and diallyl carbonate, dialkyl carbonate or ethylene carbonate are used. For example, poly(1,6-hexamethylene carbonate), poly(2,2'-bis(4-hydroxyhexyl) propane carbonate), etc. are being produced industrially. As another method of obtaining polycarbonate polyols, it is also possible to use so-called phosgene process.

Besides, vinyl type polyols such as acrylic type polyol obtainable through the copolymerization of acrylic monomer with hydroxyl group such as β-hydroxyethylacrylate or β-hydroxyethylmethacrylate with acrylic ester, polybutadiene polyols such as poly(1,4-butadiene) and poly(1,2-butadiene), castor oil-based polyols such as polypropylene glycol ricinolate, silicone-based polyols, polyolefin-based polyols, and the like can also be used.

As the polymer polyols (2) to be impregnated beforehand into PVC (1) among these polymer polyols (2), the polyester-based polyols with good compatibility with PVC (1) are preferable from the facts that low hardness PVC-PU composite can be obtained and that the impregnation into PVC (1) is easy. The compatibility of polymer polyol (2) with PVC (1) so referred to here can be evaluated through the measurement of infrared absorption spectra, and polymer polyols (2) with (v1−v2)≧3.3 (cm$^{-1}$)(v1: location of peak (cm$^{-1}$) originating from the carbonyl stretching vibration on measuring infrared absorption spectrum of polymer polyol (2) alone, v2: location of peak (cm$^{-1}$) originating from the carbonyl stretching vibration in polymer polyol (2) on measuring infrared absorption spectrum of film sample that was obtained by dissolving a mixture of 95 parts by weight of vinyl chloride-based polymer (1) with 5 parts by weight of polymer polyol (2) into tetrahydrofuran and by cast molding from the solution at a concentration of 10% by weight) have good compatibility with PVC (1), which are used preferably in the invention. As such polymer polyols (2), those with structure(s) represented by a general formula (I) and or (II) in their molecular structure are used preferably for obtaining low hardness PVC-PU composite.

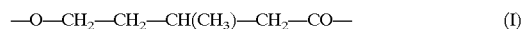
—O—CH$_2$—CH$_2$—CH(CH$_3$)—CH$_2$—CO— (I)

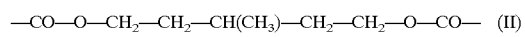
—CO—O—CH$_2$—CH$_2$—CH(CH$_3$)—CH$_2$—CH$_2$—O—CO— (II)

The formulation level of polymer polyol (2) used in the invention is preferable to be not less than 200 parts by weight to not more than 800 parts by weight to 100 parts by weight of PVC (1) from the points of low hardness and development of good compressive permanent strain. For developing good compressive permanent strain characteristic under 200 parts by weight, increase in NCO/OH molar ratio or decrease in molecular weight of polymer polyol (2) is needed, resulting in increased hardness of PVC-PU composite obtained. When exceeding 800 parts by weight, the production of PVC-PU composite sometimes becomes difficult, which is unpreferable.

For the isocyanate compounds (3) with three or more isocyanate groups, for example, isocyanurate-modified product of diisocyanate, triisocyanates such as 1,6,11-undecane-triisocyanate, lysine ester triisocyanate and 4-isocyanate-methyl-1,8-octamethyldiisocyanate, biuret-modified product, allophanate-modified product or adduct of diisocyanate and multifunctional isocyanates such as polyphenylmethane-polyisocyanate can be mentioned, and one or not less than two kinds of these are used. As the diisocyanates, 2,4- or 2,6-tolylenediisocyanate, m- or p-phenylenediisocyanate, 1-chlorophenylene-2,4-diisocyanate, 1,5-naphthalenediisocyanate, methylenebisphenylene-4,4'-diisocyanate, m- or p-xylenediisocyanate, hexamethylenediisocyanate, lysinediisocyanate, 4,4'-methylenebiscyclohexyldiisocyanate, isophoronediisocyanate, trimethylhexamethylenediisocyanate, and the like can be mentioned.

Moreover, it is also possible to use said diisocyanates in combination. In this case, however, it is preferable for developing good compressive permanent strain characteristic with the inventive PVC-PU composite to make the number of moles of isocyanate group in isocyanate compound (3) with three or more isocyanate groups to the number of moles of isocyanate group in all isocyanate compounds 0.25 or more.

Moreover, the molar ratio of isocyanate group in the isocyanate compound (3) with three or more isocyanate groups to the hydroxyl group in said polymer polyol (NCO/OH molar ratio) is preferable to be within a range of not less than 0.3 to not more than 0.8, when using diol as a polymer polyol (2), from the points of low hardness and development of good compressive permanent strain. If under 0,3, good compressive permanent strain sometimes cannot be obtained or production of PVC-PU composite becomes difficult, which is unpreferable. If exceeding 0,8, then the hardness reduction is difficult, even if the amount of polymer polyol (2) may be increased, and the number of fish eyes in the PVC-PU composite obtained sometimes increases, which is unpreferable.

The reaction for producing said PU is preferable to conduct in the presence of urethanating reaction catalyst (5). The urethanating reaction catalyst (5) is not particularly restricted and publicly known catalyst can be used. For example, amine catalysts such as triethylamine, triethylenediamine and N-methylmorpholine, tin catalysts such as tetramethyl tin, tetraoctyl tin, dimethyldioctyl tin, triethyl tin chloride, dibutyl tin diacetate and dibutyl tin dilaurate, and the like are mentioned, and one or not less than two kinds of these can be used, among which dibutyl tin dilaurate is used suitably. The amount of catalyst used varies depending on the activity of catalyst used, but it is only necessary to be an amount required for the completion of urethanating reaction. Taking dibutyl tin dilaurate as an example, an amount of not less than 1 ppm to not more than 10000 ppm to the total amount of PVC (1), polymer polyol (2), isocyanate compound (3) and plasticizer (4) is preferable from the points of productivity and processibility.

Moreover, as the plasticizers (4) to be used in the invention, for example, phthalic plasticizers such as di-n-butyl phthalate, di-2-ethylhexyl phthalate (hereinafter referred to as DOP), di-n-octyl phthalate, diisononyl phthalate, diisodecyl phthalate, diisooctyl phthalate, octyldecyl phthalate, butylbenzyl phthalate and di-2-ethylhexyl isophthalate, aliphatic ester plasticizers such as di-2-ethylhexyl adipate, di-n-decyl adipate, diisodecyl adipate, dibutyl sebacate and di-2-ethylhexyl sebacate, trimellitic plasticizers such as trioctyl trimellitate and tridecyl trimellitate, phosphoric ester plasticizers such as tributyl phosphate, tri-2-ethylhexyl phosphate, 2-ethylhexyldiphenyl phosphate and tricresyl phosphate, epoxy plasticizers such as epoxy soybean oil, polyester-based high-molecular plasticizers, and the like are mentioned, and one or not less than two kinds of these can be used.

Moreover, the formulation level of plasticizer from not less than 10 parts by weight to not more than 300 parts by weight to 100 parts by weight of PVC (1) is used suitably from the points of softening and prevention from bleeding-out.

In the invention, if adding metal salt (6) of higher fatty acid wherein the metal of metal salt of higher fatty acid is at least one element selected from a group consisting of magnesium, zinc and lead, good profile extrusion moldability can be obtained, hence use of it is preferable. The fatty chain of the metal salt (6) of higher fatty acid wherein the metal of metal salt of higher fatty acid is at least one element selected from a group consisting of magnesium, zinc and lead, is preferable to be the number of carbon atoms of not less than 7 to not more than 30 that is common as a fatty acid. Thereamong, those with the number of carbon atoms of not less than 7 to not more than 20 in the fatty chain of higher fatty acid are put widely on the market, hence use of them is preferable. As such metal salts of higher fatty acids, for example, magnesium stearate, magnesium laurate, zinc stearate, zinc laurate, lead stearate, lead laurate, and the like are mentioned. Because of easy availability and relatively low cost, magnesium stearate, magnesium laurate, zinc stearate, zinc laurate and lead stearate are preferable, among which, because of low toxicity, magnesium stearate, magnesium laurate, zinc stearate and zinc laurate are further preferable. Moreover, two or more kinds of these may be used in combination.

Furthermore, since PVC-PU composite obtainable by using magnesium salt of higher fatty acid is excellent in the hydrolysis resistance, use of magnesium stearate and/or magnesium laurate is preferable.

And, in views of developing good compressive permanent strain characteristic and affording good profile extrusion moldability, the formulation level from 0.1 to 10.0 parts by weight to 100 parts by weight of PVC is used preferably.

Moreover, as in the production method described later, when PU is formed by heating, melting and mixing PVC (1), polymer polyol (2), isocyanate compound (3) with three or more isocyanate groups, plasticizer (4), urethanating reaction catalyst (5) and metal salt (6) of higher fatty acid wherein the metal of metal salt of higher fatty acid is at least one element selected from a group consisting of magnesium, zinc and lead, under shear force, the fatty chain of higher fatty acid is preferable to be saturated hydrocarbon that does not affect the urethanating reaction.

In the invention, good profile extrusion moldability can be obtained by adding hydrocarbon-based lubricant (7), hence use of it is preferable. The hydrocarbon-based lubricant (7) is not particularly restricted and publicly known one can be used. The molecular structure is not particularly restricted, straight chain, branched chain or mixtures of these can be used. And, from the point that the PVC-PU composite with particularly good profile extrusion moldability can be produced stably, the formulation level from 0.1 to 10.0 parts by weight to 100 parts by weight of PVC is used preferably. The weight average molecular weight of hydrocarbon-based lubricant (conversion value to straight chain polyethylene by means of gel permeation chromatography (hereinafter referred to as GPC) under the conditions of 0.04% by weight trichlorobenzene solution and 140° C., same hereinafter) is preferable to be 100 to 3000 from the point of excellent profile extrusion moldability and particularly preferable to be 500 to 900 from easy production of PVC-PU composite. As such hydrocarbon-based lubricants, for example, liquid paraffin, natural paraffin, microwax, Sazole wax (from Sazole Public Corp.), synthetic paraffin, polyethylene wax, and the like are mentioned, and one or not less than two kinds of these can be used.

To the PVC-PU resin composition of the invention, stabilizers (e.g. metal soaps such as barium stearate, organic tin stabilizers such as tin laurate, phosphite stabilizers such as tetraphenyl polypropylene glycol diphosphite and hydrotalcites such as perchloric acid-treated hydrotalcite can be mentioned), lubricants (e.g. fatty acid ester-based waxes such as n-butyl stearate, etc. can be mentioned), acrylic processing aids (e.g. methyl methacrylate-alkyl acrylate copolymers such as methyl methacrylate-butyl acrylate copolymer), coloring agents, inorganic fillers represented by calcium carbonate and talc, flame retardants represented by antimony trioxide and zinc borate, and the like, which are added usually to PVC, can be added, if need be, to the extent not extremely deteriorating the performance.

For obtaining the PVC-PU composite of the invention, for example, a method wherein, after PU formed beforehand was pulverized finely by refrigeration pulverization etc., it is blended with PVC (1) and plasticizer (4), a method wherein PVC (1), polymer polyol (2), isocyanate compound (3) with three or more isocyanate groups, plasticizer (4) and urethanating reaction catalyst (5) are heated, molten and mixed under shear force to form PU, and the like can be mentioned.

And, for obtaining PVC-PU composite with low hardness, PU is preferable to be formed by heating, melting and mixing PVC (1), polymer polyol (2), isocyanate compound (3) with three or more isocyanate groups, plasticizer (4) and urethanating reaction catalyst (5) under shear force.

As the equipments for obtaining PVC-PU composite of the invention, for example, mechanical pressure kneaders such as Banbury mixer (from Fahler Co.), pressure kneader (from Moriyama Seisakusho Co., Ltd.), Internal mixer (from Kurimoto Tekkosho Co.) and Intensive mixer (from Nihon Roll Seizo Co., Ltd.) and kneading-molding machines used for the processing of plastics or rubbers such as roll molding machine and extrusion molding machine can be used. The temperature of equipment for heating, melting and mixing is 90 to 220° C. and it is preferable to make 100 to 150° C. for stably producing PVC-PU composite. If under 90° C., melting of PVC is difficult and, if over 220° C., then PVC will be in danger of causing thermal degradation.

Moreover, in the invention, from the facts that not so many fish eyes can be seen in the PVC-PU composite obtained and the possibility of yellowing due to thermal deterioration is low upon heating, melting and mixing under shear force, it is preferable to heat, melt and mix under shear force until the temperature of molten mixture reaches not lower than 160° C. to not higher than 200° C.

At this time, if heating, melting and mixing are conducted under shear force using a powdery mixture with plasticizer (4) impregnated beforehand into PVC (1), then the productivity is excellent and the surface smoothness is good on extrusion molding, which is preferable. At this time, the amount of plasticizer (4) for impregnation is preferable to be not less than 10 parts by weight to not more than 150 parts by weight to 100 parts by weight of PVC (1).

The urethanating reaction catalyst (5) may or may not be impregnated beforehand into PVC (1) together with plasticizer (5), but it is preferable to impregnate it for handling.

Furthermore, in the case of much liquid components, if heating, melting and mixing are conducted using a powdery mixture with polymer polyol (2) and plasticizer (4) or with polymer polyol (2), plasticizer (4) and urethanating reaction catalyst (5) impregnated beforehand into PVC (1), the surface smoothness on extrusion molding becomes good as well as improved productivity, which are preferable. Here, the polymer polyol (2) etc. for impregnation may be either part or all of materials for use.

If heating, melting and mixing are conducted under shear force using a powdery mixture of polymer polyol (2) and plasticizer (4) or of polymer polyol (2), plasticizer (4) and urethanating reaction catalyst (5) impregnated beforehand into PVC (1), the surface smoothness on extrusion molding becomes good as well as improved productivity, which are preferable. The total amount of polymer polyol (2) and plasticizer (4) to be impregnated into PVC (1) is preferable to be not less than 10 parts by weight to not more than 200 parts by weight to 100 parts by weight of PVC from the points that the gelling melting of PVC is liable to be facilitated and that the powder fluidity after impregnation is excellent. And, when impregnation of overall amount is difficult depending on the types and amounts of polymer polyol (2) and plasticizer (4) used, it is preferable to impregnate part of polymer polyol (2) used and/or part of plasticizer (4) used into PVC (1). Moeover, if using either polymer polyol (2) or plasticizer (4) alone for impregnating into PVC (1), then the surface smoothness on extrusion molding sometimes becomes poor, which is unpreferable.

And, if attempting to simultaneously impregnate polymer polyol (2), isocyanate compound (3) and urethanating reaction catalyst (5), then the urethanating reaction progresses prior to impregnation and clayey gel-like products are sometimes formed, which are unpreferable.

At this time, the urethanating reaction catalyst (5) may or may not be impregnated beforehand together with polymer polyol (2) and plasticizer (4) into PVC (1), but it is preferable to impregnate it for handling.

For impregnating beforehand plasticizer (4), polymer polyol (2), urethanating reaction catalyst (5), etc. into PVC (1), for example, mixers such as ribbon blender with jacket, Henschel mixer (from Mitsui Mining Co., Ltd.) or Super Mixer (from Kawata Co., Ltd.) may be used. When using such mixers, PVC (1) is added into mixer, then predetermined amounts of plasticizer (4), polymer polyol (2), urethanating reaction catalyst (5), etc. are added to this under stirring and mixing is continued until the resin temperature becomes 90 to 150° C., thereby a flowable powdery mixture of plasticizer (4), polymer polyol (2), urethanating reaction catalyst (5), etc. impregnated into PVC (1) can be obtained. If the resin temperature is under 90° C., the fluidity of powder is poor and, if over 150° C., there is a danger of forming fish eyes.

When impregnating two or more of plasticizer (4), polymer polyol (2) and urethanating reaction catalyst (5), they may be added into said mixers such as Henschel mixer after mixing beforehand, or may be added separately.

Moreover, the stabilizer for PVC is preferable to be mixed beforehand with PVC using mixer. Liquid stabilizer may be added beforehand into plasticizer.

As an example to form PU by heating, melting and mixing PVC (1), polymer polyol (2), isocyanate compound (3) with three or more isocyanate groups, plasticizer (4) and urethanating reaction catalyst (5) under shear force, a method wherein the powdery mixture with polymer polyol (2), plasticizer (4) and urethanating reaction catalyst (5) impregnated beforehand into PVC (1) in this way, and the liquid mixture obtainable by uniformly mixing isocyanate compound (3) with three or more isocyanate groups and polymer polyol (2) that was not impregnated into PVC (1) are introduced into said kneading-molding machine and then it is heated, molten and mixed under shear force, can be mentioned.

In the invention, when using hydrocarbon-based lubricant (7) and metal salt (6) of higher fatty acid wherein the metal of metal salt of higher fatty acid is at least one element selected from a group consisting of magnesium, zinc and lead, the hydrocarbon-based lubricant (7) and metal salt (6) of higher fatty acid wherein the metal of metal salt of higher fatty acid is at least one element selected from a group consisting of magnesium, zinc and lead may be melted and mixed after formed PU by heating, melting and mixing PVC (1), polymer polyol (2), isocyanate compound (3) with three or more isocyanate groups, plasticizer (4) and urethanating reaction catalyst (5) under shear force, or the hydrocarbon-based lubricant (7) and metal salt (6) of higher fatty acid wherein the metal of metal salt of higher fatty acid is at least one element selected from a group consisting of magnesium, zinc and lead, may be mixed beforehand with PVC (1) before heating, melting and mixing PVC (1), polymer polyol (2), isocyanate compound (3) with three or more isocyanate groups, plasticizer (4) and urethanating reaction catalyst (5) under shear force. But, the latter is simpler and preferable for production.

For melting and mixing, kneaders and/or granulating machines used for processing plastics or rubbers such as extruder and roll kneading machine can be used.

Moreover, the PVC-PU resin composition of the invention can be molded into moldings in the shapes of roll, hose, tube, belt, packing, sealant, sheet, tire, vibration absorber, sporting goods, miscellaneous goods for daily use, etc. by publicly known methods so far, for which the processing methods such as injection molding, extrusion molding, foam molding and blow molding are possible.

In following, the invention will be illustrated using examples, but the invention is not confined to these examples.

Synthetic Example 1

Into Henschel mixer with an internal volume of 20 liters, 2000 g of ethylene-vinyl chloride copolymer (from Tosoh Corp., trade name Reulon E-2800) obtained through suspension polymerization process and 40 g of barium stearate, 20 g of zinc stearate and 30 g of perchloric acid-treated hydrotalcite (from Nissan Ferro Organic Chemistry Co., Ltd., trade name BP-331) as stabilizers were charged, and the mixture was stirred for 1 minute at a rotational speed of 950 rpm. Moreover, apart from this, a mixture of 2000 g of DOP and 0.5 g of dibutyl tin dilaurate (urethanating reaction catalyst) mixed for 1 minute was prepared. This was added to said Henschel mixer, which was stirred and mixed until the temperature of mixture becomes 110° C. The mixture became an easily flowable powdery mixture.

Synthetic Example 2

A powdery mixture was obtained by implementing similarly to Synthetic example 1, except that 1400 g of DOP were used in place of 2000 g of DOP.

Synthetic Example 3

A powdery mixture was obtained by implementing similarly to Synthetic example 1, except that 1000 g of DOP were used in place of 2000 g of DOP.

Example 1

Into Banbury type mixer with an internal volume of 1700 cc at a casing temperature of 150° C., 100 parts by weight of ethylene-vinyl chloride polymer (from Tosoh Corp., trade name Reulon E-2800) obtained through suspension polymerization process and 2 parts by weight of barium stearate, 1 part by weight of zinc stearate and 1.5 parts by weight of perchloric acid-treated hydrotalcite (from Nissan Ferro Organic Chemistry Co., Ltd., trade name BP-331) as stabilizers were charged, and the mixture was stirred at a constant rotational speed. Moreover, apart from this, a mixture wherein 100 parts by weight of DOP (di-2-ethylhexyl phthalate), 0.025 parts by weight of dibutyl tin dilaurate (urethanating reaction catalyst) and 34 parts by weight of isocyanurate-modified product of hexamethylenediisocyanate (from Nippon Polyurethane Industry Co., Ltd., trade name Colonate HX) heated to 80° C. were mixed for 1 minute and then 266 parts by weight of polymer polyol (from Nippon Polyurethane Industry Co., Ltd., trade name Nippolan 4067, number average molecular weight 2000) heated to 80° C. (NCO/OH molar ratio=0.65) were further added and mixed for 1 minute was prepared, which was poured from the throwing-in port of Banbury type mixer. The content weighed 1540 g in total. The mixture was heated, molten and mixed under shear force and discharged 10 minutes later when the temperature of molten mixture reached 175° C. to obtain a PVC-PU composite.

The PVC-PU composite thus obtained was sheeted with roll molding machine of 130° C. The hue of sheet obtained was judged visually.

Moreover, for testing JIS-A hardness (JIS K6301) and compressive permanent strain (JIS K6301), a test piece was molded with press to measure the JIS A-hardness and compressive permanent strain.

Kneading of 150 g of sheet obtained and 2.5 g of Ultramarine Blue was conducted for 5 minutes with roll molding machine of 130° C. to obtain 0.35 mm thick sheet. The number of particles with a size larger than 0.1 mm (white or transparent particles due to nondispersed Ultramarine Blue, fish eyes) per 50 $cm^2$ of sheet was counted to evaluate the eternal appearance.

The composition and kneading conditions are shown in Table 1 and the evaluation results in Table 2.

Comparative example 1

A mixture of 1330 g of polymer polyol (from Nippon Polyurethane Industry Co., Ltd., trade name Nippolan 4067, number average molecular weight 2000) and 170 g of isocyanurate-modified product of hexamethylenediisocyanate (from Nippon Polyurethane Industry Co., Ltd., trade name Colonate HX) (NCO/OH molar ratio=0.65) mixed for 1 minute was prepared, which was spread on a vat in dryer of 120° C. and reacted for 10 hours to complete the reaction. Mixing of 1140 g of urethane thus obtained, 380 g of ethylene-vinyl chloride copolymer (from Tosoh Corp., trade name Reulon E-2800) obtained through suspension polymerization process, 380 g of DOP and 7.6 g of barium stearate, 3.8 g of zinc stearate and 5.7 g of perchloric acid-treated hydrotalcite (from Nissan Ferro Organic Chemistry Co., Ltd., trade name BP-331) was conducted for 15 minutes with roll molding machine of 150° C. Thereafter, this was sheeted and, for testing JIS A-hardness (JIS K6301) and compressive permanent strain (JIS K6301), a test piece was molded with press to measure the JIS A-hardness and compressive permanent strain.

The composition and kneading conditions are shown in Table 1 and the evaluation results in Table 2.

Example 2

Into Banbury type mixer with an internal volume of 1700 cc at a casing temperature of 150° C., 204.525 parts by weight of powder obtained in Synthetic example 1 were charged, which was stirred at a constant rotational speed. Moreover, apart from this, a mixture of 34 parts by weight of isocyanurate-modified product of hexamethylenediisocyanate (from Nippon Polyurethane Industry Co., Ltd., trade name Colonate HX) and 266 parts by weight of polymer polyol (from Nippon Polyurethane Industry Co., Ltd., trade name Nippolan 4067, number average molecular weight 2000) heated to 80° C. (NCO/OH molar ratio=0.65) mixed for 1 minute was prepared, which was poured from the throwing-in port of Banbury type mixer. The content weighed 1540 g in total. The mixture was heated, molten and mixed under shear force and discharged 5 minutes later when the temperature of molten mixture reached 175° C. to obtain a PVC-PU composite.

The PVC-PU composite thus obtained was evaluated similarly to Example 1.

The composition and kneading conditions are shown in Table 1 and the evaluation results in Table 2.

Comparative example 2

Production was made similarly to Example 2, except that 950 parts by weight of polymer polyol (from Kuraray Co., Ltd., trade name Kurapol P4010, number average molecular weight 4000) and 51 parts by weight of isocyanurate-modified product of hexamethylenediisocyanate (NCO/OH molar ratio=0.55) were used in place of 266 parts by weight of polymer polyol (from Nippon Polyurethane Industry Co., Ltd., trade name Nippolan 4067, number average molecular weight 2000) and 34 parts by weight of isocyanurate-modified product of hexamethylene-diisocyanate (NCO/OH molar ratio=0.65). However, even if kneading might be continued for 20 minutes, the mixture resulted in only a sticky paste and was difficult also to be taken out from Banbury type mixer, making the evaluation impossible.

The composition and kneading conditions are shown in Table 1.

Comparative example 3

Production was made similarly to Example 2, except that 289 parts by weight of polymer polyol (Nippon Polyurethane Industry Co., Ltd., trade name Nippolan 4067, number average molecular weight 2000) and 11 parts by weight of isocyanurate-modified product of hexamethylenediisocyanate (NCO/OH molar ratio=0.20) were used in place of 266 parts by weight of polymer polyol (from Nippon Polyurethane Industry Co., Ltd., trade name Nippolan 4067, number average molecular weight 2000) and 34 parts by weight of isocyanurate-modified product of hexamethylenediisocyanate (NCO/OH molar ratio=0.65). However, even if kneading might be continued for 20 minutes, the mixture resulted in only a sticky paste and was difficult also to be taken out from Banbury type mixer, making the evaluation impossible.

The composition and kneading conditions are shown in Table 1.

Example 3

Production and evaluation were made similarly to Example 2, except that 532 parts by weight of polymer polyol and 68 parts by weight of isocyanurate-modified product of hexamethylenediisocyanate were used in place of 266 parts by weight of polymer polyol and 34 parts by weight of isocyanurate-modified product of hexamethylene-diisocyanate. Results are shown in Table 2.

Example 4

Production and evaluation were made similarly to Example 2, except that 465 parts by weight of polymer polyol (from Kuraray Co., Ltd., trade name Kurapol P4010, number average molecular weight 4000) and 35 parts by weight of isocyanurate-modified product of hexamethylene-diisocyanate (NCO/OH molar ratio=0.75) were used in place of 266 parts by weight of polymer polyol (from Nippon Polyurethane Industry Co., Ltd., trade name Nippolan 4067, number average molecular weight 2000) and 34 parts by weight of isocyanurate-modified product of hexamethylenediisocyanate (NCO/OH molar ratio=0.65).

The composition and kneading conditions are shown in Table 1 and the evaluation results in Table 2.

Example 5

Production and evaluation were made similarly to Example 2, except that 174.525 parts by weight of powder obtained in Synthetic example 2 were used in place of 204.525 parts by weight of powder obtained in Synthetic example 1 and that 350 parts by weight of polymer polyol (from Kuraray Co., Ltd., trade name Kurapol P510, number average molecular weight 500) and 150 parts by weight of isocyanurate-modified product of hexamethylenediisocyanate (NCO/OH molar ratio=0.55) were used in place of 266 parts by weight of polymer polyol (from Nippon Polyurethane Industry Co., Ltd., trade name Nippolan 4067, number average molecular weight 2000) and 34 parts by weight of isocyanurate-modified product of hexamethylene-diisocyanate (NCO/OH molar ratio=0.65).

The composition and kneading conditions are shown in Table 1 and the evaluation results in Table 2.

Comparative example 4

Production and evaluation were made similarly to Example 2, except that 154.525 parts by weight of powder obtained in Synthetic example 3 were used in place of 204.525 parts by weight of powder obtained in Synthetic example 1 and that 180 parts by weight of polymer polyol and 30 parts by weight of isocyanurate-modified product of hexamethylenediisocyanate (NCO/OH molar ratio=0.85) were used in place of 266 parts by weight of polymer polyol and 34 parts by weight of isocyanurate-modified product of hexamethylenediisocyanate (NCO/OH molar ratio=0.65).

The composition and kneading conditions are shown in Table 1 and the evaluation results in Table 2.

Comparative example 5

Production and evaluation were made similarly to Example 2, except that 180 parts by weight of polymer polyol and 23 parts by weight of isocyanurate-modified product of hexamethylenediisocyanate were used in place of 266 parts by weight of polymer polyol and 34 parts by weight of isocyanurate-modified product of hexamethylene-diisocyanate.

The composition and kneading conditions are shown in Table 1 and the evaluation results in Table 2.

Comparative example 6

Production and evaluation were made similarly to Example 2, except that 255 parts by weight of polymer polyol (from Sanyo Chemical Industries, Ltd., trade name Sanester 24620, number average molecular weight 2000) and 45 parts by weight of isocyanurate-modified product of hexamethylenediisocyanate (NCO/OH molar ratio =0.85) were used in place of 266 parts by weight of polymer polyol (Nippon Polyurethane Industry Co., Ltd., trade name Nippolan 4067, number average molecular weight 2000) and 34 parts by weight of isocyanurate-modified product of hexamethylenediisocyanate (NCO/OH molar ratio=0.65).

The composition and kneading conditions are shown in Table 1 and the evaluation results in Table 2.

TABLE 1

| | Composition (to 100 parts by weight of PVC) | | | | Kneading conditions | |
|---|---|---|---|---|---|---|
| | Amt. of polymer polyol (Part by wt.) | M.W. of polymer polyol | NCO/OH molar ratio | Total amt. of plasticizer (Amt. of plasticizer impregnated) (Part by wt.) | Kneading time (min.) | Discharge temp. (°C.) |
| Example 1 | 266 | 2000 | 0.65 | 100 (0) | 10 | 175 |
| Example 2 | 266 | 2000 | 0.65 | 100 (100) | 5 | 175 |
| Example 3 | 532 | 2000 | 0.65 | 100 (100) | 8 | 175 |
| Example 4 | 465 | 4000 | 0.75 | 100 (100) | 4 | 192 |
| Example 5 | 350 | 500 | 0.55 | 70 (70) | 8 | 170 |
| Comparative example 1 | 266 | 2000 | 0.65 | 100 (0) | — | — |
| Comparative example 2 | 950 | 4000 | 0.55 | 100 (100) | — | — |
| Comparative example 3 | 289 | 2000 | 0.20 | 100 (100) | — | — |
| Comparative example 4 | 180 | 2000 | 0.85 | 50 (50) | 4 | 175 |
| Comparative example 5 | 180 | 2000 | 0.65 | 100 (100) | 4 | 175 |
| Comparative example 6 | 255 | 2000 | 0.85 | 100 (100) | 4 | 175 |

TABLE 2

| | Hardness | Compression set (%) | F.E.[1] | Hue |
|---|---|---|---|---|
| Example 1 | 22 | 30 | 220 | White |
| Example 2 | 22 | 30 | 190 | White |
| Example 3 | 18 | 26 | 150 | White |
| Example 4 | 25 | 32 | 300 | White |
| Example 5 | 21 | 21 | 250 | White |
| Comparative example 1 | 28 | 29 | — | — |
| Comparative example 2 | — | — | — | — |
| Comparative example 3 | — | — | — | — |
| Comparative example 4 | 53 | 24 | 1200 | White |
| Comparative example 5 | 32 | 32 | 200 | White |
| Comparative example 6 | 48 | 24 | 900 | White |

[1]Unit: Number of fish eyes/50 cm$^2$

Example 6

Into Super mixer with an internal volume of 500 liters, 100 parts by weight of ethylene-vinyl chloride copolymer (from Tosoh Corp., trade name Reulon E-2800) obtained through suspension polymerization process and 2 parts by weight of barium stearate, 1 part by weight of zinc stearate and 1.5 parts by weight of perchloric acid-treated hydrotalcite (from Nissan Ferro Organic Chemistry Co., Ltd., trade name BP-331) as stabilizers were charged, and the mixture was stirred for 1 minute. Moreover, apart from this, a mixture of 50 parts by weight of polymer polyol (from Nippon Polyurethane Industry Co., Ltd., trade name Nippolan 4067, number average molecular weight 2000), 100 parts by weight of DOP and 0.15 parts by weight of dibutyl tin dilaurate (urethanating reaction catalyst) mixed for 1 minute was prepared. This was added to said Super mixer and the mixture was stirred and mixed until the temperature of mixture became 110° C. The content weighed 150 kg in total. The mixture became an easily flowable powdery mixture.

Into pressure kneader with an internal volume of 75 liters set at a temperature of 150° C., 254.65 parts by weight of powder obtained were charged, which was stirred at a constant rotational speed. Moreover, apart from this, a mixture of 34 parts by weight of isocyanurate-modified product of hexamethylenediisocyanate (from Nippon Polyurethane Industry Co., Ltd., trade name Colonate HX) and 216 parts by weight of polymer polyol (from Nippon Polyurethane Industry Co., Ltd., trade name Nippolan 4067, number average molecular weight 2000) heated to 80° C. (NCO/OH molar ratio=0.65) mixed for 1 minute was prepared, which was poured from throwing-in port of pressure kneader. The content weighed 67.8 kg in total. The mixture was heated, molten and mixed under shear force and discharged 5 minutes later when the temperature of molten mixture reached 175° C. Namely, the production time needed to obtain PVC-PU composite was 5 minutes. The composition of composite obtained and kneading conditions are shown in Table 3.

The PVC-PU composite thus obtained was sheeted with roll molding machine of 130° C. and, for testing JIS A-hardness (JIS K6301) and compressive permanent strain (JIS K6301), a test piece was molded with press to measure the JIS A-hardness and compressive permanent strain.

Moreover, for using for extrusion molding, the sheet was granulated with sheet pelletizer.

The pellets obtained were extruded ribbon-like (width 25 mm, thickness 1 mm), using 20 mm single screw extruder (Labo Plastomill from Toyo Seiki Co., Ltd.).

The extruding conditions were cylinder temperature of 150° C., die temperature of 160° C. and number of screw revolutions of 100 rpm. The surface smoothness was evaluated by touch.

The surface smoothness was evaluated on a criterion as follows:

⊙ Very smooth

○ Smooth

Δ Somewhat sandy

X Sandy

X X Generation of grains

The evaluation results are shown in Table 4.

Moreover, the (v1–v2) of Nippolan 4067 (from Nippon Polyurethane Industry Co., Ltd., trade name Nippolan 4067, number average molecular weight 2000) determined from infrared absorption spectrum was 5 cm$^{-1}$.

Example 7

Into Henschel mixer with an internal volume of 20 liters, 100 parts by weight of ethylene-vinyl chloride copolymer (from Tosoh Corp., trade name Reulon E-2800) obtained through suspension polymerization process and 2 parts by weight of barium stearate, 1 part by weight of zinc stearate and 1.5 parts by weight of perchloric acid-treated hydrotalcite (from Nissan Ferro Organic Chemistry Co., Ltd., trade name BP-331) as stabilizers were charged, and the mixture was stirred for 1 minute at a rotational speed of 950 rpm. Moreover, apart from this, a mixture of 100 parts by weight of polymer polyol (from Nippon Polyurethane Industry Co., Ltd., trade name Nippolan 4067, number average molecular weight 2000), 100 parts by weight of DOP and 0.15 parts by weight of dibutyl tin dilaurate (urethanating reaction catalyst) mixed for 1 minute was prepared. This was added to said Henschel mixer and the mixture was stirred and mixed until the temperature of mixture became 110° C. The content weighed 4000 g in total. The mixture became an easily flowable powdery mixture.

Into Banbury type mixer with a volume of 1700 cc set at a temperature of 150° C., 304.65 parts by weight of powder obtained were charged, which was stirred at a constant rotational speed. Moreover, apart from this, a mixture of 34 parts by weight of isocyanurate-modified product of hexamethylenediisocyanate (from Nippon Polyurethane Industry Co., Ltd., trade name Colonate HX) and 166 parts by weight of polymer polyol (from Nippon Polyurethane Industry Co., Ltd., trade name Nippolan 4067, number average molecular weight 2000) heated to 80° C. (NCO/OH molar ratio=0.65) mixed for 1 minute was prepared, which was poured from throwing-in port of Banbury type mixer. The content weighed 1540 g in total. The mixture was heated, molten and mixed under shear force and discharged 3.5 minutes later when the temperature of molten mixture reached 175° C. Namely, the production time needed to obtain PVC-PU composite was 3.5 minutes. The composition of composite obtained and kneading conditions are shown in Table 3.

The evaluation of PVC-PU composite obtained was made similarly to Example 6.

The evaluation results are shown in Table 4.

Example 8

Into Henschel mixer with an internal volume of 20 liters, 100 parts by weight of ethylene-vinyl chloride copolymer (from Tosoh Corp., trade name Reulon E-2800) obtained through suspension polymerization process and 2 parts by weight of barium stearate, 1 part by weight of zinc stearate and 1.5 parts by weight of perchloric acid-treated hydrotalcite (from Nissan Ferro Organic Chemistry Co., Ltd., trade name BP-331) as stabilizers were charged, and the mixture was stirred for 1 minute at a rotational speed of 950 rpm. Moreover, apart from this, a mixture of 100 parts by weight of polymer polyol (from Nippon Polyurethane Industry Co., Ltd., trade name Nippolan 4067, number average molecular weight 2000), 50 parts by weight of DOP and 0.15 parts by weight of dibutyl tin dilaurate (urethanating reaction catalyst) mixed for 1 minute was prepared. This was added to said Henschel mixer and the mixture was stirred and mixed until the temperature of mixture became 110° C. The content weighed 4000 g in total. The mixture became an easily flowable powdery mixture.

Into Banbury type mixer with a volume of 1700 cc set at a temperature of 150° C., 254.65 parts by weight of powder obtained were charged, which was stirred at a constant rotational speed. Moreover, apart from this, a mixture of 34 parts by weight of isocyanurate-modified product of hexamethylenediisocyanate (from Nippon Polyurethane Industry Co., Ltd., trade name Colonate HX) and 50 parts by weight of DOP and 166 parts by weight of polymer polyol (from Nippon Polyurethane Industry Co., Ltd., trade name Nippolan 4067, number average molecular weight 2000) heated to 80° C. (NCO/OH molar ratio=0.65) mixed for 1 minute was prepared, which was poured from throwing-in port of Banbury type mixer. The content weighed 1540 g in total. The mixture was heated, molten and mixed under shear force and discharged 3.5 minutes later when the temperature of molten mixture reached 175° C. Namely, the production time needed to obtain PVC-PU composite was 3.5 minutes. The composition of composite obtained and kneading conditions are shown in Table 3.

The evaluation of PVC-PU composite obtained was made similarly to Example 6.

The evaluation results are shown in Table 4.

Example 9

Into Henschel mixer with an internal volume of 20 liters, 100 parts by weight of ethylene-vinyl chloride copolymer (from Tosoh Corp., trade name Reulon E-2800) obtained through suspension polymerization process and 2 parts by weight of barium stearate, 1 part by weight of zinc stearate and 1.5 parts by weight of perchloric acid-treated hydrotalcite (from Nissan Ferro Organic Chemistry Co., Ltd., trade name BP-331) as stabilizers were charged, and the mixture was stirred for 1 minute at a rotational speed of 950 rpm. Moreover, apart from this, a mixture of 100 parts by weight of polymer polyol (from Nippon Polyurethane Industry Co., Ltd., trade name Nippolan 4067, number average molecular weight 2000) and 50 parts by weight of DOP mixed for 1 minute was prepared. This was added to said Henschel mixer and the mixture was stirred and mixed until the temperature of mixture became 110° C. The content weighed 4000 g in total. The mixture became an easily flowable powdery mixture.

Into Banbury type mixer with a volume of 1700 cc set at a temperature of 150° C., 254.50 parts by weight of powder obtained were charged, which was stirred at a constant rotational speed. Moreover, apart from this, a mixture of 50 parts by weight of DOP, 0.15 parts by weight of dibutyl tin dilaurate (urethanating reaction catalyst), 34 parts by weight of isocyanurate-modified product of hexamethylenediisocyanate (from Nippon Polyurethane Industry Co., Ltd., trade name Colonate HX) and 166 parts by weight of polymer polyol (from Nippon Polyurethane Industry Co., Ltd., trade name Nippolan 4067, number average molecular weight 2000) heated to 80° C. (NCO/OH molar ratio=0.65) mixed for 1 minute was prepared, which was poured from throwing-in port of Banbury type mixer. The content weighed 1540 g in total. The mixture was heated, molten and mixed under shear force and discharged 3.5 minutes later when the temperature of molten mixture reached 175° C. Namely, the production time needed to obtain PVC-PU composite was 3.5 minutes. The composition of composite obtained and kneading conditions are shown in Table 3.

The evaluation of PVC-PU composite obtained was made similarly to Example 6.

The evaluation results are shown in Table 4.

TABLE 3

| | Composition (to 100 parts by weight of PVC) | | Impregna- | Kneading conditions | |
|---|---|---|---|---|---|
| | Total amt. of polymer polyol (Amt. of polymer polyol impregnated) (Part by wt.) | Total amt. of plasticizer (Amt. of plasticizer impregnated) (Part by wt.) | tion of catalyst (Note 1) | Kneading time (min) | Discharge temp. (°C.) |
| Example 6 | 266 (50) | 100 (100) | o | 5.0 | 175 |
| Example 7 | 266 (100) | 100 (100) | o | 3.5 | 175 |
| Example 8 | 266 (100) | 100 (50) | o | 3.5 | 175 |
| Example 9 | 266 (100) | 100 (50) | x | 3.5 | 175 |

(Note 1)
o: PVC with urethanating catalyst impregnated
x: PVC without urethanating catalyst impregnated

TABLE 4

| | Hardness | Compression set (%) | Surface smoothness |
|---|---|---|---|
| Example 6 | 21 | 34 | ⊙ |
| Example 7 | 21 | 37 | o |
| Example 8 | 21 | 36 | o |
| Example 9 | 21 | 36 | o |

Example 10

Into Henschel mixer with an internal volume of 20 liters, 100 parts by weight of ethylene-vinyl chloride copolymer (from Tosoh Corp., trade name Reulon E-2800) obtained through suspension polymerization process and 2 parts by weight of zinc stearate, 2 parts by weight of microwax (from Nippon Seiro Co., Ltd., LUVAX 2191) and 2 parts by weight of barium stearate and 1.5 parts by weight of perchloric acid-treated hydrotalcite (from Nissan Ferro Organic Chemistry Co., Ltd., trade name BP-331) were charged, and the mixture was stirred for 1 minute at a rotational speed of 950 rpm. Moreover, apart from this, a mixture of 50 parts by weight of polymer polyol (from Nippon Polyurethane Industry Co., Ltd., trade name Nippolan 4067, number average molecular weight 2000), 100 parts by weight of DOP and 0.15 parts by weight of dibutyl tin dilaurate (urethanating reaction catalyst) mixed for 1 minute was prepared. This was added to said Henschel mixer and the mixture was stirred and mixed until the temperature of mixture became 110° C. The content weighed 4000 g in total. The mixture became an easily flowable powdery mixture.

Into Banbury type mixer with a volume of 1700 cc set at a temperature of 150° C., 257.65 parts by weight of powder obtained were charged, which was stirred at a constant rotational speed. Moreover, apart from this, a mixture of 34 parts by weight of isocyanurate-modified product of hexamethylenediisocyanate (from Nippon Polyurethane Industry Co., Ltd., trade name Colonate HX) and 216 parts by weight of polymer polyol (from Nippon Polyurethane Industry Co., Ltd., trade name Nippolan 4067, number average molecular weight 2000) heated to 80° C. (NCO/OH molar ratio=0.65) mixed for 1 minute was prepared, which was poured from throwing-in port of Banbury type mixer. The content weighed 1540 g in total. The mixture was heated, molten and mixed under shear force and discharged when the temperature of molten mixture reached 175° C. The composition is shown in Table 5.

The PVC-PU composite thus obtained was sheeted with roll kneader of 130° C. and, for testing compressive permanent strain (JIS K6301), a test piece was molded with press to measure the compressive permanent strain. Results are shown in Table 6.

Moreover, for using for extrusion molding, part of the sheet was granulated with sheet pelletizer.

The pellets obtained were extrusion molded using 20 mm single screw extruder (Labo Plastomill from Toyo Seiki Co., Ltd.).

For the die, Garve die described in ASTM D2230-90 was used and the extrusion molding was conducted under the extruding conditions of cylinder temperature of 170° C., die temperature of 180° C. and number of screw revolutions of 100 rpm. The external appearance on extrusion was evaluated according to ASTM System B (edge). Results are shown in Table 6.

In the evaluation, numeral 1 is worst and 10 best.

The weight average molecular weight of microwax (from Nippon Seiro Co., Ltd., LUVAX 2191) was 620. For the measurement, 150 C. (from Waters Corp.) being a GPC apparatus was used and, connecting three columns of TSK-GEL GMHHR-H(S) (from Tosoh Corp., inner diameter 7.8 mm, length 300 mm) in series, the measurement was conducted under the conditions of column temperature of 140° C., flow rate of 1.0 ml/min and 0.04% by weight trichlorobenzene solution to determine the weight average molecular weight as a conversion value to straight chain polyethylene.

Example 11

Production and evaluation were made similarly to Example 10, except that 1 part by weight was used in place of 2 parts by weight of zinc stearate, that 5 parts by weight of Sazole wax (from Sazole Public Corp., trade name H1) were used in place of 2 parts by weight of microwax (from Nippon Seiro Co., Ltd., trade name LUVAX 2191) and that 259.65 parts by weight of powder were thrown into Banbury type mixer in place of 257.65 parts by weight of powder.

The composition is shown in Table 5 and the evaluation results in Table 6.

The weight average molecular weight of Sazole wax (from Sazole Public Corp., trade name H1) was 810. The measurement was conducted similarly to Example 10.

Example 12

Production and evaluation were made similarly to Example 10, except that 3 parts by weight of zinc laurate were used in place of 2 parts by weight of zinc stearate and that 1 part by weight of Synthetic wax (from Toyo Petrolite Co., Ltd., trade name P-850) was used in place of 2 parts by weight of microwax (from Nippon Seiro Co., Ltd., trade name LUVAX 2191).

The composition is shown in Table 5 and the evaluation results in Table 6.

The weight average molecular weight of synthetic wax (from Toyo Petrolite Co., Ltd., trade name P-850) was 870. The measurement was conducted similarly to Example 10.

Example 13

Production and evaluation were made similarly to Example 10, except that 1 part by weight of zinc stearate and 1 part by weight of zinc laurate were used in place of 2 parts by weight of zinc stearate and that 1 part by weight of microwax (from Nippon Seiro Co., Ltd., trade name LUVAX 2191) and 1 part by weight of Sazole wax (from Sazole Public Corp., trade name H1) were used in place of 2 parts by weight of microwax (from Nippon Seiro Co., Ltd., trade name LUVAX 2191).

The composition is shown in Table 5 and the evaluation results in Table 6.

Example 14

Into Henschel mixer with an internal volume of 20 liters, 100 parts by weight of ethylene-vinyl chloride copolymer (from Tosoh Corp., trade name Reulon E-2800) obtained through suspension polymerization process and 2 parts by weight of barium stearate and 1.5 parts by weight of perchloric acid-treated hydrotalcite (from Nissan Ferro Organic Chemistry Co., Ltd., trade name BP-331) as stabilizers were charged, and the mixture was stirred for 1 minute at a rotational speed of 950 rpm. Moreover, apart from this, a mixture of 30 parts by weight of polymer polyol (from Nippon Polyurethane Industry Co., Ltd., trade name Nippolan 4067, number average molecular weight 2000), 70 parts by weight of DOP and 0.10 parts by weight of dibutyl tin dilaurate (urethanating reaction catalyst) mixed for 1 minute was prepared. This was added to said Henschel mixer and the mixture was stirred and mixed until the temperature of mixture became 110° C. The content weighed 4000 g in total. The mixture became an easily flowable powdery mixture.

Into Banbury type mixer with a volume of 1700 cc set at a temperature of 150° C., 203.60 parts by weight of powder obtained were charged, which was stirred at a constant rotational speed. Moreover, apart from this, a mixture of 14.5 parts by weight of isocyanurate-modified product of hexamethylenediisocyanate (from Nippon Polyurethane Industry Co., Ltd., trade name Colonate HX) and 115.5 parts by weight of polymer polyol (from Nippon Polyurethane Industry Co., Ltd., trade name Nippolan 4067, number average molecular weight 2000) heated to 80° C. (NCO/OH molar ratio=0.50) mixed for 1 minute was prepared, which was poured from throwing-in port of Banbury type mixer. The content weighed 1540 g in total. The mixture was heated, molten and mixed under shear force and discharged when the temperature of molten mixture reached 175° C.

Kneading of 333.60 parts by weight of PVC-PU composite obtained, 1 part by weight of zinc stearate and 2 parts by weight of microwax (from Nippon Seiro Co., Ltd., trade name LUVAX 2191) was conducted for 5 minutes with roll kneader of 130° C., then this was sheeted to evaluate similarly to Example 10.

The composition is shown in Table 5 and the evaluation results in Table 6.

Example 15

Into Henschel mixer with an internal volume of 20 liters, 100 parts by weight of ethylene-vinyl chloride copolymer (from Tosoh Corp., trade name Reulon E-2800) obtained through suspension polymerization process, 1 part by weight of zinc stearate, 1 part by weight of microwax (from Nippon Seiro Co., Ltd., trade name LUVAX 2191) and 2 parts by weight of barium stearate and 1.5 parts by weight of perchloric acid-treated hydrotalcite (from Nissan Ferro Organic Chemistry Co., Ltd., trade name BP-331) were charged, and the mixture was stirred for 1 minute at a rotational speed of 950 rpm. Moreover, apart from this, a mixture of 120 parts by weight of DOP and 0.10 parts by weight of dibutyl tin dilaurate (urethanating reaction catalyst) mixed for 1 minute was prepared. This was added to said Henschel mixer and the mixture was stirred and mixed until the temperature of mixture became 110° C. The content weighed 4000 g in total. The mixture became an easily flowable powdery mixture.

Into Banbury type mixer with a volume of 1700 cc set at a temperature of 150° C., 225.60 parts by weight of powder obtained were charged, which was stirred at a constant rotational speed. Moreover, apart from this, a mixture of 14.5 parts by weight of isocyanurate-modified product of hexamethylenediisocyanate (from Nippon Polyurethane Industry Co., Ltd., trade name Colonate HX) and 105.5 parts by weight of polymer polyol (from Nippon Polyurethane Industry Co., Ltd., trade name Nippolan 4067, number average molecular weight 2000) heated to 80° C. (NCO/OH molar ratio=0.70) mixed for 1 minute was prepared, which was poured from throwing-in port of Banbury type mixer. The content weighed 1540 g in total. The mixture was heated, molten and mixed under shear force and discharged when the temperature of molten mixture reached 175° C.

The PVC-PU resin composition obtained was sheeted with roll kneader of 130° C. and evaluated similarly to Example 10.

The composition is shown in Table 5 and the evaluation results in Table 6.

TABLE 5

|  | NCO/OH molar ratio | Amt. of PU Part by wt.[1] | Amt. of plasticizer Part by wt.[1] | Metal salt of higher fatty acid | | Hydrocarbon-based lubricant | | |
|---|---|---|---|---|---|---|---|---|
|  |  |  |  | Type | Part by wt.[1] | Type | Av. molecular weight | Part by wt.[1] |
| Example 10 | 0.65 | 300 | 100 | Zinc stearate | 2 | Microwax | 620 | 2 |
| Example 11 | 0.65 | 300 | 100 | Zinc stearate | 1 | Sazole wax | 810 | 5 |
| Example 12 | 0.65 | 300 | 100 | Zinc stearate | 3 | Synthetic wax | 870 | 1 |
| Erample 13 | 0.65 | 300 | 100 | Zinc stearate Zinc laurate | 1 | Microwax Sazole | 620 810 | i 1 |

TABLE 5-continued

| | NCO/OH molar ratio | Amt. of PU Part by wt.[1] | Amt. of plasticizer Part by wt.[1] | Metal salt of higher fatty acid | | Hydrocarbon-based lubricant | | |
|---|---|---|---|---|---|---|---|---|
| | | | | Type | Part by wt.[1] | Type | Av. molecular weight | Part by wt.[1] |
| Example 14 | 0.50 | 160 | 70 | Zinc stearate | 1 | wax Microwax | 620 | 2 |
| Example 15 | 0.70 | 120 | 120 | Zinc stearate | 1 | Microwax | 620 | 1 |

[1] Value to 100 parts by weight of PVC

TABLE 6

| | ASTM evaluation System B Edge | Compression set (%) |
|---|---|---|
| Example 10 | 8 | 36 |
| Example 11 | 7 | 36 |
| Example 12 | 8 | 37 |
| Example 13 | 8 | 36 |
| Example 14 | 8 | 43 |
| Example 15 | 8 | 43 |

Example 16

Into Henschel mixer with an internal volume of 20 liters, 100 parts by weight of ethylene-vinyl chloride copolymer (from Tosoh Corp., trade name Reulon E-2800) obtained through suspension polymerization process, 1 part by weight of magnesium stearate (hereinafter referred to as Mg stearate), 5 parts by weight of microwax (from Nippon Seiro Co., Ltd., trade name LUVAX 2191) and 2 parts by weight of barium stearate and 1.5 parts by weight of perchloric acid-treated hydrotalcite (from Nissan Ferro Organic Chemistry Co., Ltd., trade name BP-331) were charged, and the mixture was stirred for 1 minute at a rotational speed of 950 rpm. Moreover, apart from this, a mixture of 50 parts by weight of polymer polyol (from Nippon Polyurethane Industry Co., Ltd., trade name Nippolan 4067, number average molecular weight 2000), 100 parts by weight of DOP and 0.15 parts by weight of dibutyl tin dilaurate (urethanating reaction catalyst) mixed for 1 minute was prepared. This was added to said Henschel mixer and the mixture was stirred and mixed until the temperature of mixture became 110° C. The content weighed 4000 g in total. The mixture became an easily flowable powdery mixture.

Into Banbury type mixer with a volume of 1700 cc set at a temperature of 110° C., 257.65 parts by weight of powder obtained were charged, which was stirred at a constant rotational speed. Moreover, apart from this, a mixture of 34 parts by weight of isocyanurate-modified product of hexamethylenediisocyanate (from Nippon Polyurethane Industry Co., Ltd., trade name Colonate HX) and 216 parts by weight of polymer polyol (from Nippon Polyurethane Industry Co., Ltd., trade name Nippolan 4067, number average molecular weight 2000) heated to 80° C. (NCO/OH molar ratio=0.65) mixed for 1 minute was prepared, which was poured from throwing-in port of Banbury type mixer. The content weighed 1540 g in total. The mixture was heated, molten and mixed under shear force and discharged when the temperature of molten mixture reached 175° C. The composition is shown in Table 7.

The PVC-PU resin composition obtained was sheeted with roll kneader of 130° C. and, for testing compressive permanent strain (JIS K6301), a test piece was molded with press to measure the compressive permanent strain. Results are shown in Table 8.

Moreover, for testing hydrolysis resistance, the PVC-PU resin composition obtained was sheeted with roll kneader of 130° C. and a test piece was molded with press (thickness 1 mm). The hydrolysis resistance test was conducted by exposure-acceleration testing under following conditions of apparatus using a thermohygrostat (from Isuzu Seisakusho, model MFP-734) to evaluate and judge the deterioration in external appearance.

Temperature: 70° C.

Humidity: 95%

Testing time: 6 weeks

The evaluation and judgement, of the deterioration in external appearance resulting from this test were made on a criterion shown below.

○ No change

X Discoloration together with sticking

Results are shown in Table 8.

Moreover, for using for extrusion molding, part of the sheet was granulated with sheet pelletizer.

The pellets obtained were extrusion molded using 20 mm single screw extruder (Labo Plastomill from Toyo Seiki Co., Ltd.).

For the die, Garve die described in ASTM D2230-90 was used and the extrusion conditions were cylinder temperature of 170° C., die temperature of 180° C. and number of screw revolutions of 100 rpm. The external appearance on extrusion was evaluated according to ASTM System B (edge). Results are shown in Table 8.

In the evaluation, numeral 1 is worst and 10 best.

Moreover, the weight average molecular weight of microwax (from Nippon Seiro Co., Ltd., LUVAX 2191) was 620.

For the measurement of hydrocarbon-based lubicant, 150 C. (from Waters Corp.) being a GPC apparatus was used and, connecting three columns of TSK-GEL GMHHR-H(S) (from Tosoh Corp., inner diameter 7.8 mm, length 300 mm) in series, the measurement was conducted under the conditions of column temperature of 140° C., flow rate of 1.0 ml/min and 0.04% by weight trichlorobenzene solution to determine the weight average molecular weight as a conversion value to straight chain polyethylene.

Example 17

Production and evaluation were made similarly to Example 16, except that 5 parts by weight were used in place of 1 part by weight of Mg stearate and that 263.65 parts by weight of powder were thrown into Banbury type mixer in place of 259.65 parts by weight of powder.

The composition is shown in Table 7 and the evaluation results in Table 8.

Example 18

Production and evaluation were made similarly to Example 16, except that 2 parts by weight were used in place of 1 part by weight of Mg stearate, that 2 parts by weight were used in place of 5 parts by weight of microwax (from Nippon Seiro Co., Ltd., trade name LUVAX 2191) and that 257.65 parts by weight of powder were thrown into Banbury type mixer in place of 259.65 parts by weight of powder.

The composition is shown in Table 7 and the evaluation results in Table 8.

Example 19

Production and evaluation were made similarly to Example 16, except that 5 parts by weight were used in place of 1 part by weight of Mg stearate, that 2 parts by weight were used in place of 5 parts by weight of microwax (from Nippon Seiro Co., Ltd., trade name LUVAX 2191) and that 260.65 parts by weight of powder were thrown into Banbury type mixer in place of 259.65 parts by weight of powder.

The composition is shown in Table 7 and the evaluation results in Table 8.

TABLE 7

|  | NCO/OH molar ratio | Amt. of PU Part by wt.[1] | Amt. of plasticizer Part by wt.[1] | Metal salt of higher fatty acid Type | Part by wt.[1] | Hydrocarbon-based lubricant Type | Av. molecular weight | Part by wt.[1] |
|---|---|---|---|---|---|---|---|---|
| Example 16 | 0.65 | 300 | 100 | Mg stearate | 1 | Microwax | 620 | 5 |
| Example 17 | 0.65 | 300 | 100 | Mg stearate | 5 | Microwax | 620 | 5 |
| Example 18 | 0.65 | 300 | 100 | Mg stearate | 2 | Microwax | 620 | 2 |
| Example 19 | 0.65 | 300 | 100 | Mg stearate | 5 | Microwax | 620 | 2 |

[1]Value to 100 parts by weight of PVC

TABLE 8

| | ASTM evaluation System B Edge | Compression set (%) | Hydrolysis resistance |
|---|---|---|---|
| Example 16 | 7 | 34 | ○ |
| Example 17 | 9 | 34 | ○ |
| Example 18 | 8 | 34 | ○ |
| Example 19 | 8 | 34 | ○ |

What is claimed is:

1. A vinyl chloride-containing polymer-polyurethane composite comprising a vinyl chloride-containing polymer (1):

a polyurethane which is formed by heating, melting and mixing under shear force 200 to 800 parts by weight of polymer polyol (2) to 100 parts by weight of vinyl chloride-containing polymer (1) and an isocyanate compound (3) with three or more isocyanate groups in a molar ratio of isocyanate groups in the isocyanate compound (3) to hydroxyl groups in the polymer polyol (2) of 0.3 to 0.8;

10 to 300 parts by weight of a plasticizer (4) to 100 parts by weight of vinyl chloride-containing polymer (1);

0.1 to 10.0 parts by weight of a metal salt (6) of a fatty acid to 100 parts by weight of vinyl chloride-containing polymer (1), the metal of the metal salt (6) of the fatty acid being at least one element selected from the group consisting of magnesium, zinc and lead; and 0.1 to 10.0 parts by weight of a hydrocarbon lubricant (7) with a weight average molecular weight of 500 to 900 (conversion value to straight chain polyethylene by gel permeation chromatography under the conditions of 0.04% by weight trichlorobenzene solution and 140° C.) to 100 parts by weight of the vinyl chloride-containing polymer (1).

2. The vinyl chloride- containing polymer-polyurethane composite of claim 1, wherein the metal salt (6) of the fatty acid is selected from the group consisting of lead stearate, zinc stearate, zinc laurate, magnesium stearate and magnesium laurate.

3. The vinyl chloride-containing polymer-polyurethane composite of claim 1, wherein the metal salt (6) of the fatty acid is magnesium stearate, magnesium laurate or both.

4. The vinyl chloride-containing polymer-polyurethane composite of claim 1, wherein the polymer polyol (2) has $(v1-v2) \geq 3.3$ $(cm^{-1})$ (v1: location of peak $(cm^{-1})$ originating from the carbonyl stretching vibration on measuring infrared absorption spectrum of polymer polyol (2) alone, v2: location of peak $(cm^{-1})$ originating from the carbonyl stretching vibration in polymer polyol (2) on measuring infrared absorption spectrum of film sample that was obtained by dissolving a mixture of 95 parts by weight of vinyl-chloride-containing polymer (1) with 5 parts by weight of polymer polyol (2) into tetrahydrofuran and by cast molding from the solution at a concentration of 10 % by weight).

5. The vinyl chloride-containing polymer-polyurethane composite of claim 1, wherein the polymer polyol (2) has a structure represented by formula (I) and/or formula (II) in its molecular structure

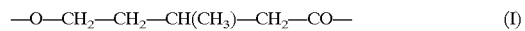
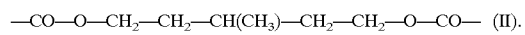

$$-O-CH_2-CH_2-CH(CH_3)-CH_2-CO- \quad (I)$$
$$-CO-O-CH_2-CH_2-CH(CH_3)-CH_2-CH_2-O-CO- \quad (II).$$

6. A method of producing a vinyl chloride-containing polymer-polyurethane composite which is produced by using 200 to 800 parts by weight of polymer polyol (2), an isocyanate compound (3) with three or more isocyanate groups in a molar ratio of isocyanate groups in the isocyanate compound (3) to hydroxyl groups in the polymer polyol (2) of 0.3 to 0.8, 10 to 300 parts by weight of a plasticizer (4), an urethanating reaction catalyst (5), 0.1 to 10.0 parts by weight of a metal salt (6) of a fatty acid, the metal of the metal salt (6) of the fatty acid being at least one element selected from the group consisting of magnesium, zinc and lead, and 0.1 to 10.0 parts by weight of hydrocarbon lubricant (7) with a weight average molecular weight of 500 to 900 (conversion value to straight chain polyethylene by gel permeation chromatography under the conditions of 0.04% by weight trichlorobenzene solution and 140° C.) to 100 parts by weight of the vinyl chloride-containing polymer (1), said method comprising the steps of:

(a) (i) dry blending the polymer polyol (2) and plasticizer (4), or (ii) dry blending polymer polyol (2), plasticizer (4) and urethanating reaction catalyst (5) into the vinyl chloride-containing polymer (1) to produce a powdery mixture;

(b) adding the isocyanate compound (3) to the powdery mixture obtained in step (a); and (c) heating, melting and mixing the mixture under shear force thereby converting the mixture to a vinyl chloride-containing polymer-polyurethane composite wherein the metal salt (6) of a fatty acid and the hydrocarbon lubricant (7) are added prior to or after step (c).

7. The method of producing vinyl chloride-containing polymer-polyurethane composite of claim 6, wherein, in step (a), the total amount of polymer polyol (2) and plasticizer (4) impregnated into the vinyl chloride-containing polymer (1) is between 10 to 200 parts by weight to 100 parts by weight of vinyl chloride-containing polymer (1).

8. The method of producing a vinyl chloride-containing polymer-polyurethane composite which is produced by using 200 to 800 parts by weight of polymer polyol (2), an isocyanate compound (3) with three or more isocyanate groups in a molar ratio of isocyanate groups in the isocyanate compound (3) to hydroxyl groups in the polymer polyol (2) of 0.3 to 0.8, 10 to 300 parts by weight of a plasticizer (4), an urethanating reaction catalyst (5), 0.1 to 10.0 parts by weight of a metal salt (6) of a fatty acid, the metal of the metal salt (6) of the fatty acid being at least one element selected from the group consisting of magnesium, zinc and lead, and 0.1 to 10.0 parts by weight of hydrocarbon lubricant (7) with a weight average molecular weight of 500 to 900 (conversion value to straight chain polyethylene by gel permeation chromatography under the conditions of 0.04% by weight trichlorobenzene solution and 140° C.) to 100 parts by weight of the vinyl chloride-containing polymer (1), said method comprising the steps of:

(a) (i) dry blending a portion of the polymer polyol (2) and plasticizer (4), or (ii) dry blending a portion of the polymer polyol (2), plasticizer (4) and urethanating reaction catalyst (5) into the vinyl chloride-containing polymer (1) to produce a powdery mixture;

(b) adding the isocyanate compound (3) and any remaining polymer polyol (2), plasticizer (4) and/or urethanating reaction catalyst (5) to the powdery mixture obtained in step (a); and thereafter (c) melting the mixture and mixing under shear force to produce the vinyl chloride-containing polymer-polyurethane composite wherein the metal salt (6) of a fatty acid and the hydrocarbon lubricant (7) are added prior to or after step (c).

* * * * *